United States Patent [19]

Morimoto et al.

[11] Patent Number: 5,055,663
[45] Date of Patent: Oct. 8, 1991

[54] OPTICAL SCANNING SYSTEM AND METHOD FOR ADJUSTING THEREOF

[75] Inventors: Akira Morimoto; Akira Ohwaki, both of Tokyo, Japan

[73] Assignee: Asahi Kogaku Kogyo Kabushiki Kaisha, Tokyo, Japan

[21] Appl. No.: 372,536

[22] Filed: Jun. 28, 1989

[30] Foreign Application Priority Data

Jun. 28, 1988 [JP] Japan .................. 63-159742
Sep. 30, 1988 [JP] Japan .................. 63-246500

[51] Int. Cl.$^5$ .......................................... H01J 40/00
[52] U.S. Cl. .................. 250/201.4; 250/235; 359/662; 359/663; 359/206
[58] Field of Search .......... 250/201.4, 204, 216, 250/234–236; 350/6.1, 6.5, 6.8, 415, 455, 457

[56] References Cited

U.S. PATENT DOCUMENTS

| | | | |
|---|---|---|---|
| 3,926,507 | 12/1975 | Nakagawa | 350/455 |
| 4,165,149 | 8/1979 | Suzki et al. | 350/6.1 |
| 4,199,219 | 4/1980 | Suzki et al. | 350/6.8 |
| 4,251,129 | 2/1981 | Suzki et al. | 350/6.8 |
| 4,269,478 | 5/1981 | Maeda et al. | 350/6.8 |
| 4,312,588 | 1/1982 | Minoura et al. | 350/415 |
| 4,356,392 | 10/1982 | Wittekoek et al. | 250/561 |
| 4,445,126 | 8/1984 | Tsukada | 350/6.5 |
| 4,851,698 | 7/1989 | Hippenmeyer | 350/415 |
| 4,925,279 | 5/1990 | Shirota | 350/415 |

FOREIGN PATENT DOCUMENTS

| | | |
|---|---|---|
| 60-123815 | 7/1985 | Japan . |
| 63-37364 | 7/1988 | Japan . |
| 7904579 | 6/1979 | Netherlands . |

OTHER PUBLICATIONS

English Language abstract of Japanese Application 60-123815.

Primary Examiner—David C. Nelms
Assistant Examiner—S. Allen
Attorney, Agent, or Firm—Sandler, Greenblum & Bernstein

[57] ABSTRACT

An optical scanning system has a deflector for deflecting a beam emitted from a light source portion, a telecentric scanning lens for focusing the deflected beam onto a scanning surface, a beam splitter for splitting a beam reflected by the scanning surface on an optical path between the deflector and the light source portion from an outgoing optical path, and a focus point detector for receiving the beam split by the beam splitter and detecting a focused state of the beam on the scanning surface.

15 Claims, 15 Drawing Sheets

SPHERICAL ABERRATION

ASTIGMATISM

DISTORTION

FIG. 19
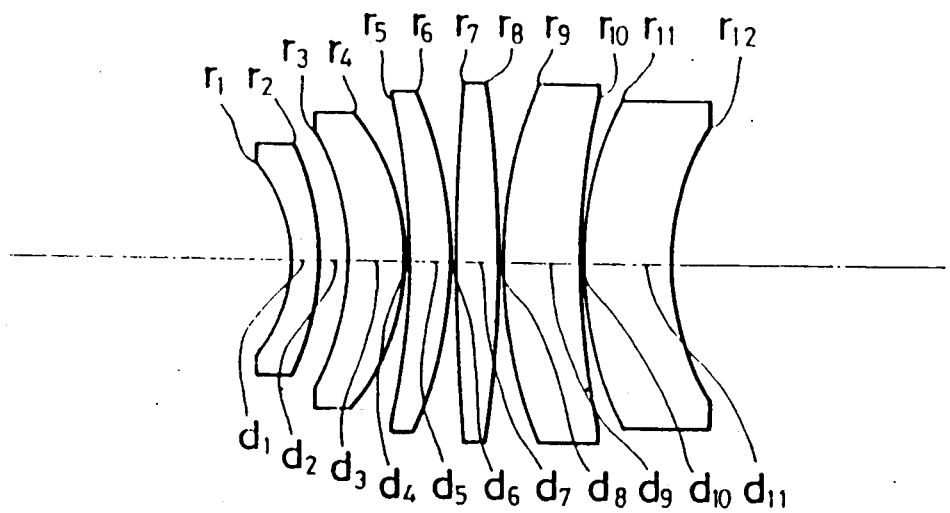
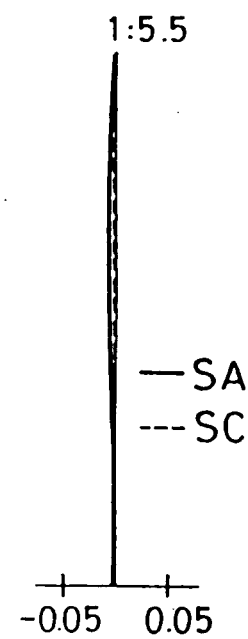
FIG. 20A
SPHERICAL ABERRATION
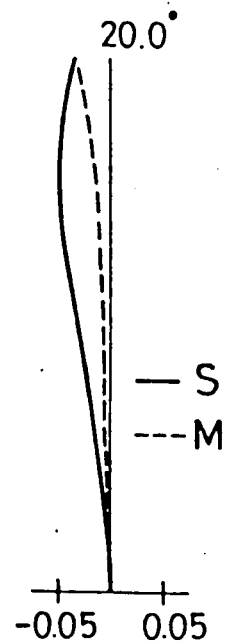
FIG. 20B
ASTIGMATISM
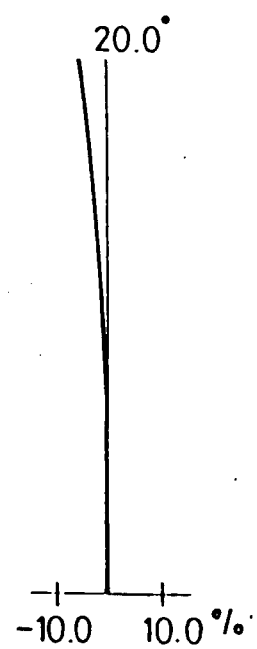
FIG. 20C
DISTORTION

SPHERICAL ABERRATION

ASTIGMATISM

DISTORTION

SPHERICAL
ABERRATION

ASTIGMATISM

DISTORTION

SPHERICAL
ABERRATION

ASTIGMATISM

DISTORTION

1:5.5

—SA
---SC

-0.05  0.05

SPHERICAL
ABERRATION 20.0°

—S
---M

-0.05  0.05

ASTIGMATISM 20.0°

-10.0  10.0 %

DISTORTION

FIG. 30A — SPHERICAL ABERRATION (1:5.5, —SA, ---SC, -0.05 to 0.05)

FIG. 30B — ASTIGMATISM (20.0°, —S, ---M, -0.05 to 0.05)

FIG. 30C — DISTORTION (20.0°, -10.0 to 10.0 %)

OPTICAL SCANNING SYSTEM AND METHOD FOR ADJUSTING THEREOF

BACKGROUND OF THE INVENTION

1. Field of the Invention

This invention relates to an optical scanning system for scanning a spot formed on a scanning surface by a deflector through a telecentric scanning lens. More particularly, it relates to an optical scanning system and a method for adjusting thereof which includes means for detecting a focusing state of the spot on the scanning surface.

2. Description of the Prior Art

In an optical scanning system, wherein the flatness of a scanning surface of a photographic plate, film, etc. is low and wherein there is a possibility for the scanning surface to be shifted forward and backward in the direction of the optical axis, or wherein a high accuracy is required for an image position, a telecentric scanning lens is used so as not to displace the position of an image when a focusing error is occurs.

Since the optical scanning system requires a certain period of time for forming a two-dimensional image, it is impossible to detect the adjusting state by projecting an image as in the case with a non-scanning type imaging system when various optical elements (i.e., lenses, a deflector, etc.) are adjusted in an optical axis thereof, or in a focal point, or in eccentricity.

Therefore, the adjusting work was often performed with difficulties.

Furthermore, in an optical scanning system which requires a high drawing density, it is necessary to use a scanning lens having a small F-number in order to reduce the diameter of the spot on the scanning surface. For example, heretofore, the spot diameter required for drawing a pattern of a printed circuit board on a dry plate, film, etc. was a minimum of approximately 30 μm. However, the spot diameter is a minimum of approximately 5 μm for one in which a high accuracy is required, as in the case for drawing lead frame for an IC, etc. or for an apparatus in which a high density is required, as in the case for writing onto a liquid crystal display, etc.

In the case of a Gaussian beam, if the spot diameter is represented by S, the F-number of the beam focused by a scanning lens is represented by FNO, the wave-length is represented by λ and the depth of focus is represented by $f_d$, the following relations are obtained:

$$S = (4/\pi) \cdot \lambda \cdot FNO$$

$$f_d = (4/\pi) \cdot \lambda \cdot (FNO)^2$$

Therefore, in the case where λ=488 nm, in order to make S=30 μm, F-number is about 1:50, and the depth of focus at this time is $f_d = \pm 1.55$ mm. Therefore, even if the flatness of the scanning surface is ±1 mm, the spot diameter is hardly changed and no substantial affect is given to the drawing performance.

However, in order to reduce the spot diameter to S=5 μm with the same λ=488 nm, F-number must be about 1:8, and the depth of focus at this time becomes $f_d = \pm 0.04$ mm. Consequently, even when the scanning surface has a minor irregularity (or waviness) of about 0.1 mm, the spot diameter is largely changed to deteriorate the drawing performance.

Such inconvenience as just mentioned arise not only by irregularities or waviness of the scanning surface, but also by the inclination or displacement of a lens and the curvature of field of the scanning lens.

The prior art of telecentric scanning lens is disclosed in Japanese patent early laid-open publication No. Sho 60-123815. The telecentric fθ lens disclosed in this publication has a positive power as a whole, a negative power of the first group is struck out by three positive lenses, a meniscus lens being disposed in such a fashion as to face its concave surface toward the image field side having a small power in order to obtain a total balancing.

However, the telecentric fθ lens described in the above-mentioned publication is small in radius of curvature of three positive lens group on average, and spherical aberration due to insufficient correction occurred at these lenses and the large Petzval sum become more difficult to be corrected by negative lenses of the final group, particularly as the F-number becomes smaller. Therefore, in order to restrain the affection of the spherical aberration and the curvature of field, it is obliged to limit the F-number to approximately =8.3 for practical use.

In order to increase the volume of information on the scanning surface, it is required that F-number of the lens is made small in order to make small the spot diameter and that various aberrations are restricted to small values.

However, it is difficult for the above-mentioned lenses to meet these requirements. Also, in general, as the F-number becomes smaller, it becomes more difficult to correct the aberration within a wide range of scanning angles and therefore, it is difficult for the fθ lens, for which high accuracy was heretofore required, to take the range of scanning angle wide.

SUMMARY OF THE INVENTION

The present invention has been accomplished by using such characteristic as that a beam reflected by a scanning surface returns toward a light source through the same route when a telecentric scanning lens is used. An object of the present invention is to make it easy to adjust the optical elements in an optical scanning system and to prevent an occurence of the performance deterioration to a beam spot due of focusing errors.

Another object of the present invention is to provide an fθ lens of high accuracy and of a wide range of scanning angle as a telecentric scanning lens used in the above-mentioned system.

In order to achieve these objects, an optical scanning system according to the present invention comprises a deflector for deflecting a beam emitted from a light source; a telecentric scanning lens for focusing the deflected beam onto a scanning surface; a beam splitter for splitting the beam reflected by the scanning surface somewhere on an optical path between the deflector and the light source from an outgoing optical path; and focus point detecting means for receiving the beam split by the beam splitter and detecting a focused state of the beam on the scanning surface.

The present invention is also characterized in that there is used, as a telecentric scanning lens, a telecentric fθ lens which comprises, in order from an object field side, a first lens group including a negative meniscus lens with a concave surface thereof faced toward the object field; a second lens group including four or five positive lenses, the lens nearest to the object field side being a positive meniscus lens with a concave surface thereof faced toward the object field side; and a third lens group including a meniscus lens of a weak power with a concave surface thereof faced toward an image field.

BRIEF DESCRIPTION OF THE DRAWINGS

FIGS. 1-8 show a first embodiment of an optical scanning system according to the present invention, wherein FIG. 1 is a schematic view showing the total arrangement thereof, FIG. 2 is a sectional view of a lens of a beam expander, FIG. 3 is a sectional view of an fθ lens, FIG. 4 is a sectional view of a lens within a primary scanning sectional plane of a focal point detecting optical system, FIG. 5 is a sectional view of a lens within a secondary scanning sectional plane of FIG. 4 and FIG. 6 through FIG. 8 are illustrations showing a spot diagram of a four-division sensor.

FIGS. 9-16 show a second embodiment of an optical scanning system according to the present invention, wherein FIG. 9 is a schematic view showing the total arrangement thereof, FIG. 10 is a sectional view of a lens of a beam expander, FIG. 11 is a sectional view of an fθ lens, FIG. 12 is a sectional view of a lens within a primary scanning sectional plane of a focal point detecting optical system, FIG. 13 is a sectional view of a lens within a secondary scanning sectional plane of FIG. 12 and FIG. 14 through FIG. 16 are illustrations showing a spot diagram of a four-division sensor.

FIG. 17 through FIG. 30 are illustrations showing a modified embodiment of a telecentric fθ lens, wherein FIG. 17, FIG. 19, FIG. 21, FIG. 23, FIG. 25, FIG. 27 and FIG. 29 are sectional views of a lens system showing various modified embodiment thereof, and FIG. 18, FIG. 20, FIG. 22, FIG. 24, FIG. 26, FIG. 28 and FIG. 30 are aberration diagrams of a lens system of various modifications thereof.

DETAILED DESCRIPTION OF THE EMBODIMENTS

An optical scanning system according to the present invention will now be described with reference to the accompanying drawings.

FIRST EMBODIMENT

Figure 1:
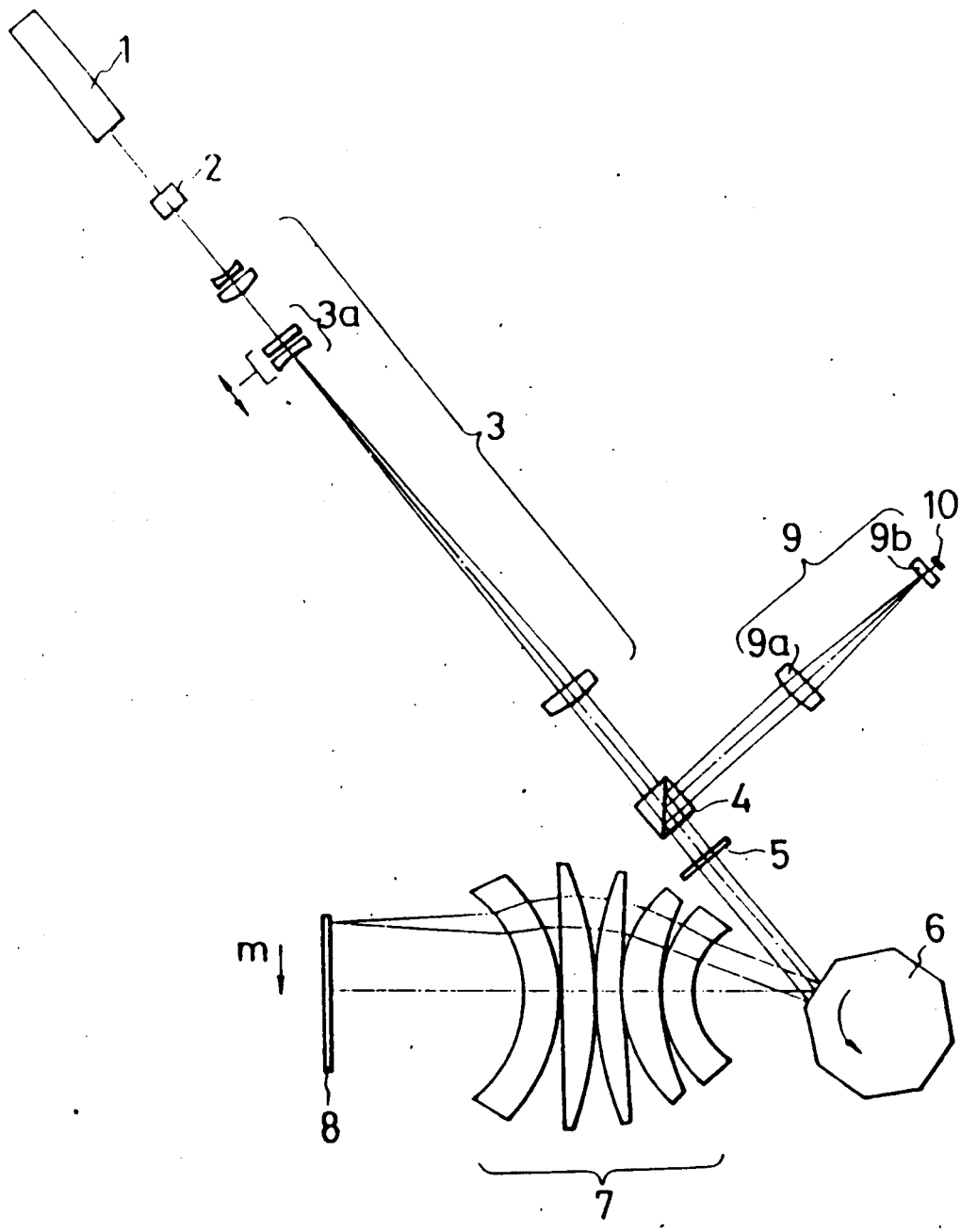

FIG. 1 through FIG. 8 show a first embodiment of the present invention. Are optical scanning system, as shown in FIG. 1, comprises an argon laser ($\lambda=488$ nm) 1 as a light source, an A/O modulator 2 for modulating a beam emitted from the argon laser 1, a beam expander 3 for expanding the diameter of parallel rays of light from 0.70 $\phi$ to 1.46 $\phi$, (where $\phi=$ diameter and its unit is mm), a polarized beam splitter 4, a quarter-wave plate 5, a polygon mirror 6 as a deflector for deflecting beam, a fθ lens 7 as a scanning lens for focusing the deflected beam, a scanning surface 8, a focal point detecting optical system 9 including a condenser 9a and a cylindrical lens 9b, and a four-division sensor 10 for detecting a focused state of the beam on the scanning surface.

In this embodiment, the third and fourth lens groups 3a of the beam expander 3 are slided forward and backward in the direction of an optical axis. The beam expander has such a function as focal point adjusting means for changing a focusing position of beam.

Constitution of each beam expander is shown in FIG. 2 through FIG. 5, and concrete values are as shown in Table 1.

Reference character r in the figure and in Table 1 represents the radius of curvature of a plane, d represents a lens thickness and distance of air space, n represents a refractive index of a lens, d0 represents a distance between a pupil position of the fθ lens and the first plane of the fθ lens. The unit thereof is mm.

The distance from a surface of the cylinder lens 9b at the sensor 10 side to the sensor 10 is 4.7 mm.

Figure 2:
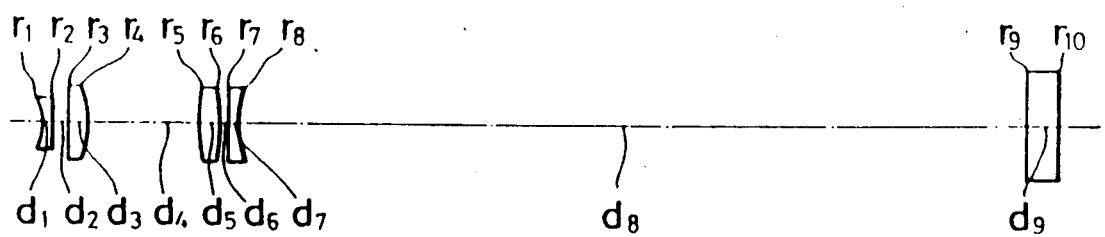
Figure 3:
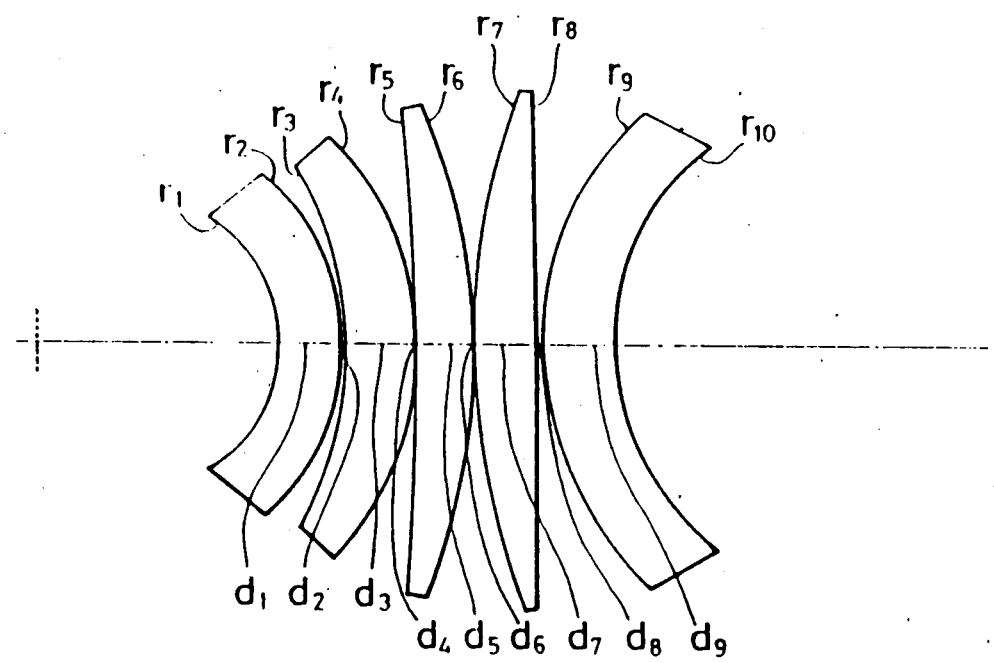
Figure 4:
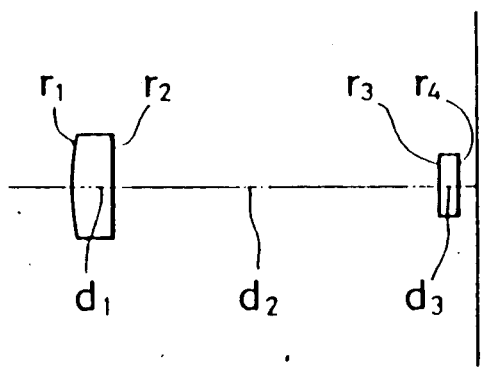
Figure 5:
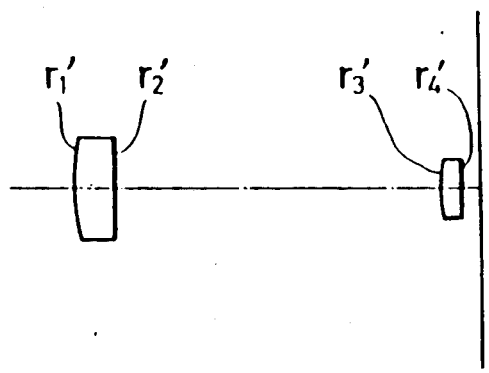

The constitution of the beam expander 3 is shown in FIG. 2, the constitution of the fθ lens is shown in FIG. 3, and the constitution of the focus point detecting system 9 is shown in FIG. 4 and FIG. 5. Regarding the focus point detecting system 9, FIG. 4 shows a principal scanning direction, and FIG. 5 shows an auxiliary scanning direction.

In Table 2 the radius of curvature in the principal scanning direction is represented by r and the radius of curvature in the auxiliary scanning direction is represented by r'.

TABLE 1

| [Beam expander] | | |
|---|---|---|
| r1 = −12.181 | d1 = 2.860 | n1 = 1.66091 |
| r2 = 353.663 | d2 = 3.710 | |
| r3 = −83.000 | d3 = 4.820 | n3 = 1.66091 |
| r4 = −29.440 | d4 = 29.300 | |
| r5 = 77.394 | d5 = 5.020 | n5 = 1.68718 |
| r6 = −480.000 | d6 = 2.230 | |
| r7 = 488.111 | d7 = 3.550 | n7 = 1.68718 |
| r8 = 30.000 | d8 = .218.155 | |
| r9 = −1476.000 | d9 = 8.400 | n9 = 1.80593 |
| r10 = −186.600 | | |
| [f θ lens] | | |
| f = 100.09 | | d0 = 64.27 |
| r1 = −36.557 | d1 = 16.400 | n1 = 1.73859 |
| r2 = −54.705 | d2 = 1.150 | |
| r3 = −86.653 | d3 = 18.600 | n3 = 1.72977 |
| r4 = −73.184 | d4 = 0.200 | |
| r5 = −549.899 | d5 = 14.600 | n5 = 1.72977 |
| r6 = −146.496 | d6 = 0.200 | |
| r7 = 172.227 | d7 = 16.100 | n7 = 1.72977 |
| r8 = −3160.823 | d8 = 1.800 | |
| r9 = 77.544 | d9 = 18.500 | n9 = 1.82718 |
| r10 = 60.950 | | |
| [focal point detecting lens] | | | |
| r1 = 50.000 | r'1 = 50.000 | d = 10.000 | n1 = 1.52177 |
| r2 = ∞ | r'2 = ∞ | d = 80.000 | |
| r3 = ∞ | r'3 = 20.000 | d = 5.000 | n1 = 1.52177 |
| r4 = ∞ | r'4 = ∞ | | |

The function of the optical scanning system will now be described.

A beam emitted from the argon laser 1 is modulated by the A/O modulator 2 and expanded by the beam expander 3. Since the argon laser 1 is disposed such that the beam is made incident with respect to the polarized beam splitter 4 as a p-polarized light, the light beam is almost 100% transmitted therethrough at the time when the beam is just emitted.

The beam transmitted through the polarized beam splitter 4 is converted into a circularly polarized light by the quarter-wave plate 5, then reflected by the polygon mirror 6 so as to be made incident to the fθ lens 7 and then focused onto the scanning surface 8. The focused beam spot is scanned in the principal scanning direction indicated by m in the figure in accordance with rotation of the polygon mirror 6, and the scanning surface 8 is moved in the auxiliary scanning direction perpendicular to the paper surface.

The scanning surface 8 is arranged thereon with a photosensitive material, photo-resist, etc., so that a two-dimensional pattern is formed on the scanning surface 8 according to an exposure or nonexposure due to the modulation of the light beam by means of the A/O modulator 2 and due to the movement of the scanning surface 8.

A part of the light which reached the scanning surface 8, is regularly reflected by the scanning surface 8 and returns to the light source side via the same route from which it came through the fθ lens 7 and the polygon mirror 6.

However, since the reflected beam is already inverted in phase by 180° by means of the reflection on the scanning surface 8, it becomes, when being transmitted through the quarter-wave plate 5 a linearly polarized light having a vibration surface in the perpendicular direction to the direction when it was emitted and is made incident to the beam splitter 4 as an s-polarized light.

Figure 6:
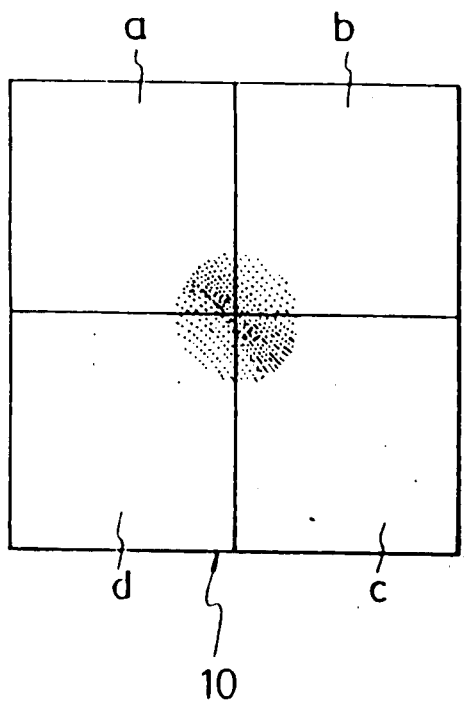
Figure 7:
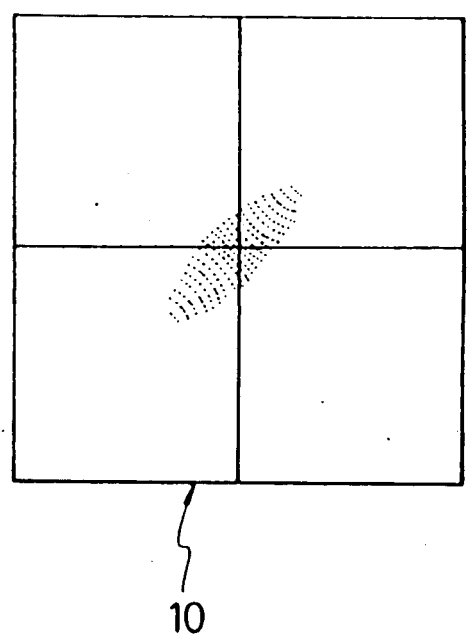
Figure 8:
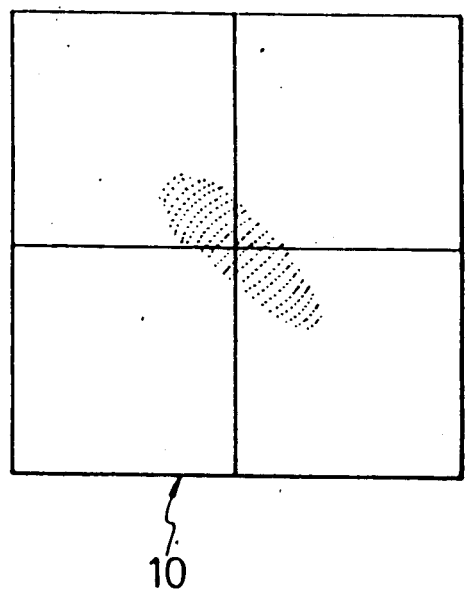

Therefore, the reflected beam is reflected almost 100% by the beam splitter 4 and guided to the focus point detecting system 9. This focus point detecting system 9 is different in power between the principal scanning sectional surface and the auxiliary scanning sectional surface and is converged in a circular shape, as shown in FIG. 6 when the spot is well focused on the scanning surface, whereas it is converged into an elliptical shape as shown in FIG. 8 when the scanning surface 8 is separated from the fθ lens 7 by 0.3 mm.

Therefore, by calculating the sum of output power of light receiving portions a,b,c and d positioned at diagonal angles of the light receiving element 10 in accordance with the formula listed below, there can be obtained a focus point detecting signal Sf according to the astigmatic method:

$$Sf = (a+c) - (b+d)$$

the focus point detecting signal Sf can be utilized in two ways. One is when the system is assembled and adjusted and the other is when the drawing is actually effected.

That is, in the case where the optical axes of the lenses, light source, etc. are not in alignment with each other, or in the case where the lenses are eccentric or they are inclined with respect to the optical axis, since the focusing state is changed with respect to the scanning surface by the incident image height with respect to the fθ lens, the states of eccentricity, inclination, etc. can be obtained by detecting this change from the output power of the light receiving element 10 while rotating the polygon mirror 6. Therefore, the system can be assembled and adjusted according to this information.

In the case where the light receiving system is used only for assembling and adjustment, the third and fourth lens group 3a of the beam expander 3 is not required to be made movable, as described above. When the system is delivered, it may be designed such that the light receiving system is removed.

Next, the function of another case will be described, wherein the focus point detecting signal is used for auto focus.

A control circuit (not shown) displaces the third and fourth lens group 3a of the beam expander 3 altogether in the direction of the optical axis so that the beam can be focused on the scanning surface according to the focus point detecting signal Sf.

At this time, the ratio of the moving amount of the position of the focus point of the spot is about 1:10 with respect to that of the third and fourth lens group 3a, and therefore, there can be obtained an accurate auto focus even when the driving of the third and fourth lens group 3a is rather rough.

Therefore, such a driving mechanism structure using a DC motor, etc. can sufficiently achieve the object of the invention. Since driving by means of a DC motor, etc. cannot be coped with at a high speed, it is difficult to adjust a focusing error caused by, for example, tiny irregularities or curvatures of field of the fθ lens. However, in case where the scanning surface 8 is gently waved, a focus point adjustment can be effected with high accuracy.

SECOND EMBODIMENT

FIG. 9 through FIG. 16 show a second embodiment of the present invention. In the following description, members similar to or identical with those of the first embodiment are denoted by similar or identical reference numerals, and duplicate description will be avoided.

Figure 9:
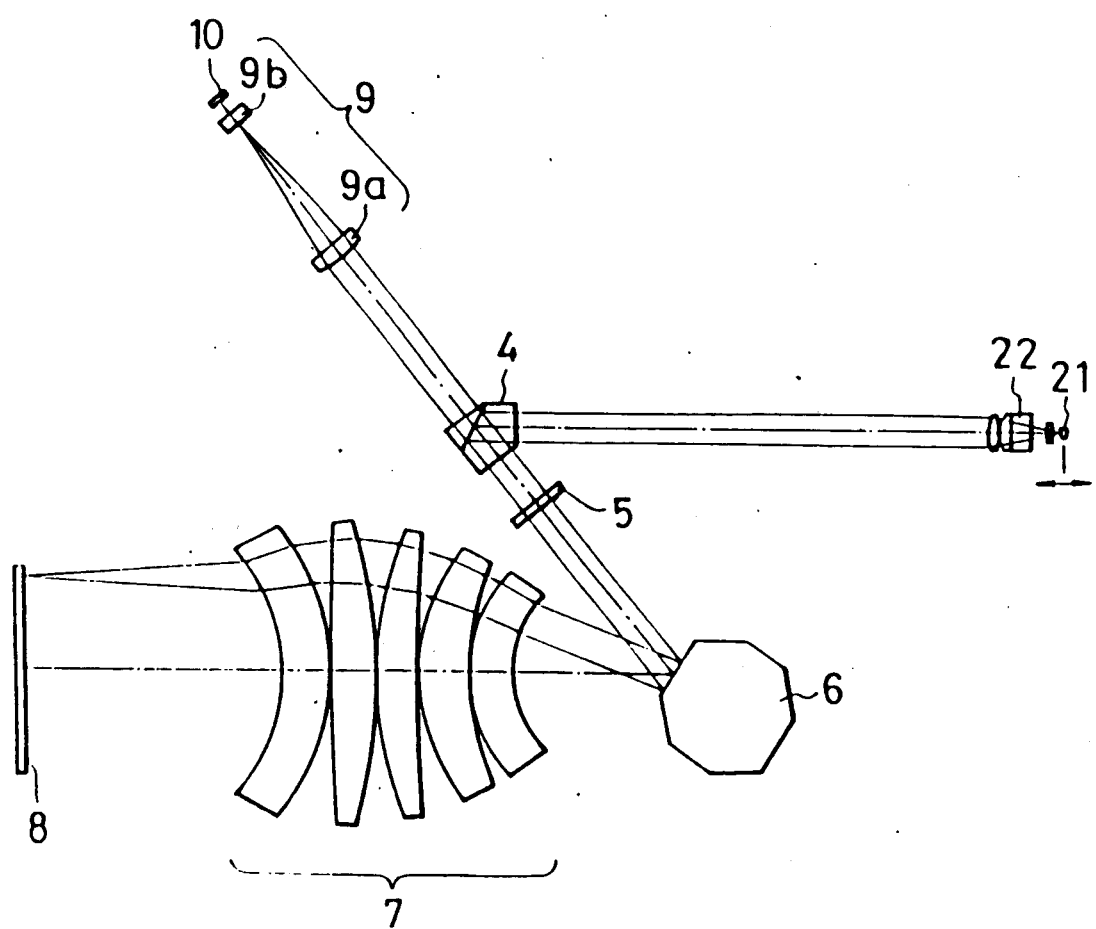

This optical scanning system, as shown in FIG. 9, comprises a semiconductor laser ($\lambda = 780$ nm) 21 as a light source, a collimator lens 22 for generally collimating a divergent beam emitted from the semiconductor laser 21, a polarized beam splitter 4, a quarter-wave plate 5, a polygon mirror 6, an fθ lens 7, a scanning surface 8, a focus point detecting optical system 9 including a condenser lens 9a and a cylinder lens 9b, and a four division sensor 10.

In this embodiment, by changing the distance between the semiconductor laser 21 and the collimator lens 22, the divergent angle of the beam is adjusted to adjust the position of the focus point on the scanning surface 8 of the spot.

Further, since light emitted from the semiconductor laser 21 exhibits an anisotropy, in order to obtain an elliptical shape elongate in the principal scanning direction on the scanning surface, the vertical direction to the jointing surface, i.e., the direction having a large divergent angle is in alignment with the principal scanning direction.

Moreover, due to the foregoing arrangement, the beam is made incident to the polarized beam splitter 4 as an S-polarized light.

The detailed construction of various optical elements is shown in FIG. 10 through FIG. 13, and concrete values are as shown in Table 1. The definition of the reference numerals in the figures and table are the same as that of the first embodiment.

Figure 10:
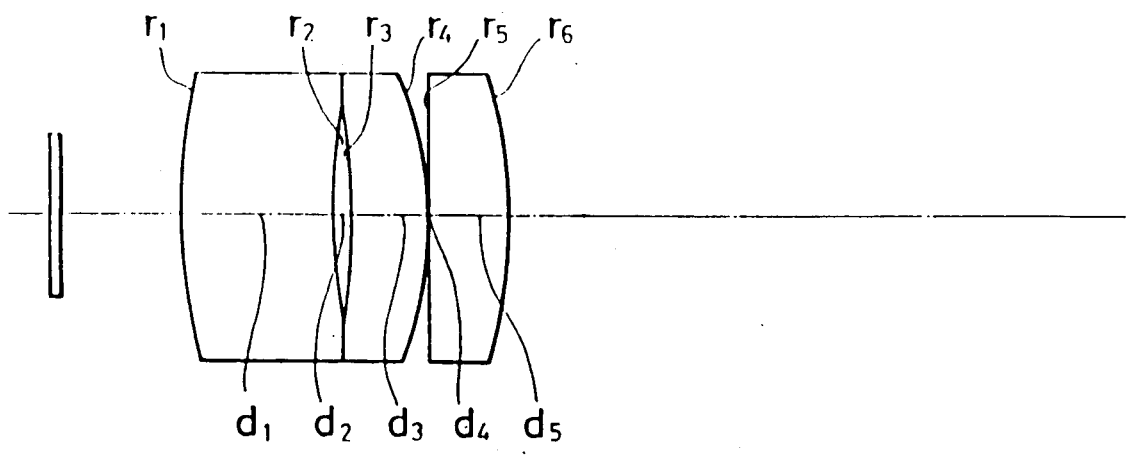
Figure 11:
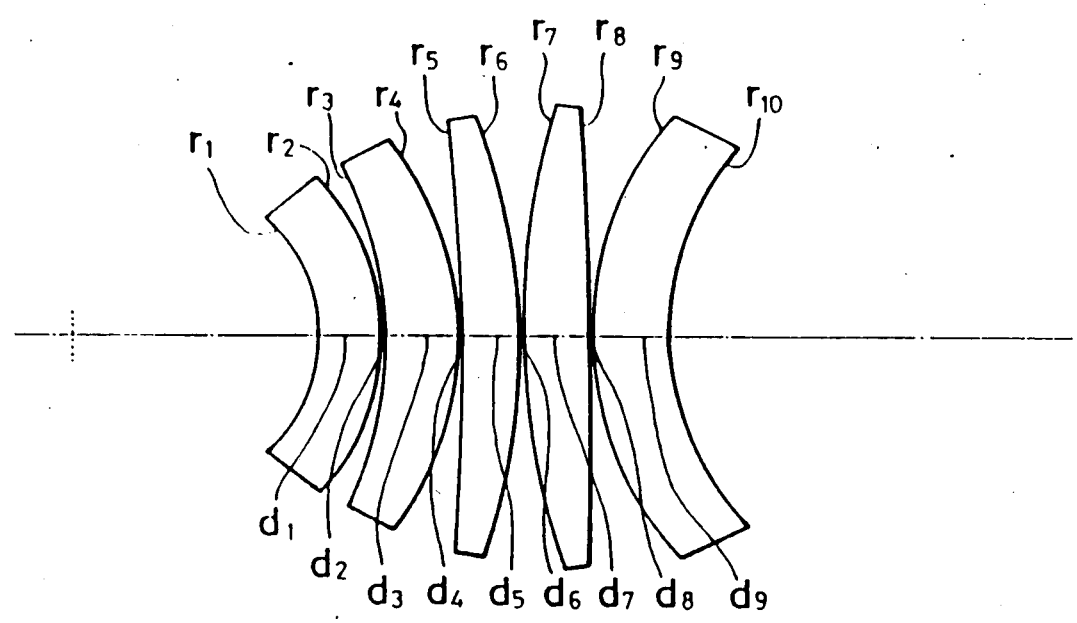

The distance between the semiconductor laser 21 and the collimator lens 22 is 5.017 mm (but including a cover of a refractive index of 1.49 and a thickness of 0.25 mm), the diameter of beam of the light emitted from the collimator lens 22 is 6 $\phi$, and the distance from a surface of the cylinder lens 9b of the sensor 10 side to the sensor 10 is 2.55 mm. The constitution of the collimator lens 22 is shown in FIG. 10, that of the fθ lens is shown in FIG. 11 and that of the focus point detecting system 9 is shown in FIGS. 12 and 13.

Figure 12:
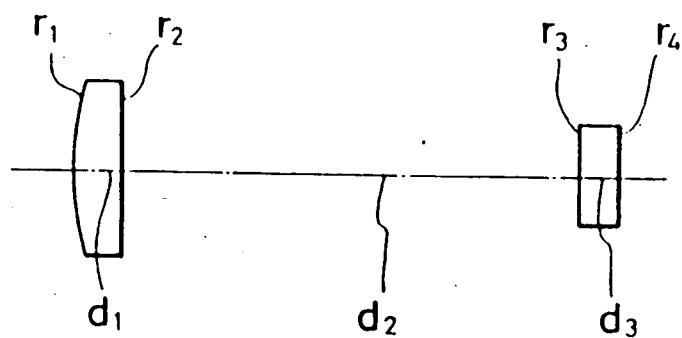
Figure 13:
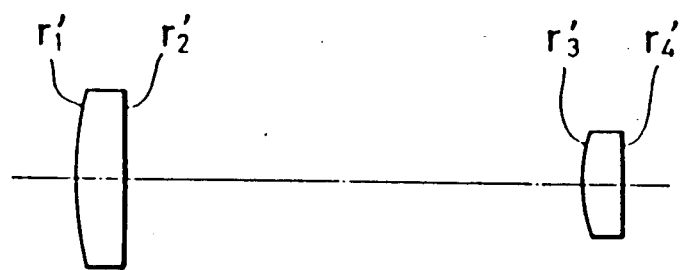

Regarding the focus point detecting system 9, the principal scanning section is shown in FIG. 12 and the auxiliary scanning section is shown in FIG. 13.

In Table 2, the curvature of the principal scanning direction is represented by r and that of the auxiliary scanning direction is represented by r'.

TABLE 2

[Collimator lens]

| | | |
|---|---|---|
| r1 = −12.734 | d1 = 3.990 | n1 = 1.79323 |
| r2 = 14.677 | d2 = 0.400 | |
| r3 = −28.090 | d3 = 2.000 | n3 = 1.78565 |
| r4 = −9.466 | d4 = 0.080 | |
| r5 = −111.999 | d5 = 2.000 | n5 = 1.78565 |
| r6 = −11.652 | | |

[fθ lens]

| | | |
|---|---|---|
| f = 50.001 | d0 = 31.500 | |
| r1 = −18.093 | d1 = 8.060 | n1 = 1.70608 |
| r2 = −27.020 | d2 = 0.050 | |
| r3 = −43.621 | d3 = 9.330 | n3 = 1.71043 |
| r4 = −36.395 | d4 = 0.500 | |
| r5 = −285.000 | d5 = 7.330 | n5 = 1.71043 |
| r6 = −71.400 | d6 = 0.500 | |
| r7 = 91.368 | d7 = 8.070 | n7 = 1.71043 |
| r8 = −1069.190 | d8 = 0.500 | |
| r9 = 38.328 | d9 = 9.290 | n9 = 1.78565 |
| r10 = 30.734 | | |

[focal point detecting lens]

| | | | |
|---|---|---|---|
| r1 = 18.000 | r'1 = 18.000 | d = 3.000 | n1 = 1.51072 |
| r2 = ∞ | r'2 = ∞ | d = 28.000 | |
| r3 = ∞ | r'3 = 7.000 | d = 2.500 | n1 = 1.51072 |
| r4 = ∞ | r'4 = ∞ | | |

The function of the above-mentioned optical scanning system will now be described.

The divergent beam directly modulated by the emitted light from the semiconductor laser 21 is collimated by the collimator lens 22, made incident to the polarized beam splitter 4 as an S-polarized beam and then generally 100% reflected by the splitter 4.

The beam reflected by the polarized beam splitter 4 is converted to a circularly polarized beam by the quarter-wave plate 5, reflected by the polygon mirror 6 and made incident onto the fθ lens, and then focused to the scanning surface 8. The focused spot is scanned in the principal scanning direction as indicated by m in the figure, and the scanning surface is moved in the direction vertical to the paper surface according to the rotation of the polygon mirror 6.

A two-dimensional pattern due to an exposure or nonexposure is formed on the scanning surface 8 by means of the spot scanning, the beam modulation of the semiconductor laser 1 and the movement of the scanning surface 8.

A part of the light that reaches the scanning surface 8 is regularly reflected by the scanning surface 8 and made incident to the beam splitter 4 as a p-polarized beam via the same route to that when it comes.

Figure 14:
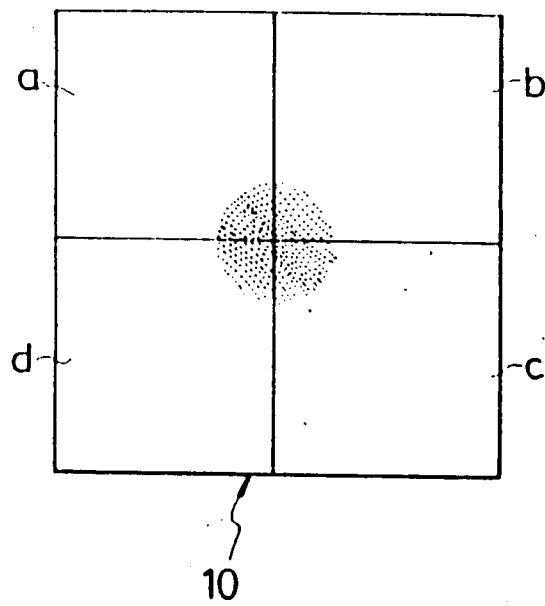
Figure 15:
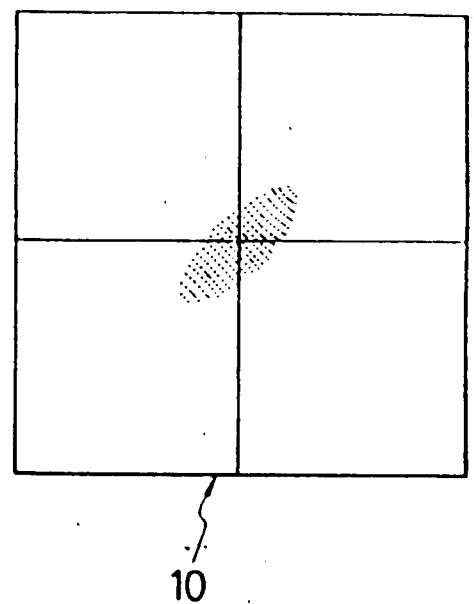
Figure 16:
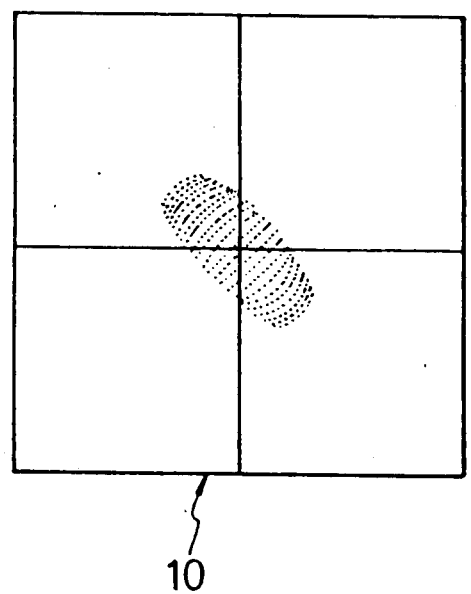

Therefore, the reflected light transmits the beam splitter 4 generally 100% and is guided to the focus point detecting system 9. This focus detecting system 9 is different in power at the principal scanning section and at the auxiliary scanning section. When the spot is well focused on the scanning surface, the spot is circularly converged as shown in FIG. 14, whereas when the scanning surface 8 is separated from the fθ lens 7 by 0.4 mm is converged into an elliptical shape as shown in FIG. 15 and when the scanning surface 8 is approached to the fθ lens 7 by 0.4 mm, the spot is converged into an elliptical shape as shown in FIG. 16.

The focus point detecting signal Sf, according to the astigmatic method can be obtained in the same manner as in the first embodiment. There are two cases as use of this signal as in the preceding embodiment.

In the case where the focus point detecting signal Sf is used in order to be auto-focused, the distance between the semiconductor laser 21 and the collimator lens 22 are adjusted as such that beam is well focused on the scanning surface according to the focus point detecting signal Sf.

At this time, since the focal length of the collimator lens 22 is 9 mm and that of the fθ lens is 50 mm, the vertical power becomes 31 times, and the ratio of the moving amount of the focus point of the spot with respect to the varying amount of the distance between the semiconductor laser 21 and the collimator lens 22 becomes approximately 31:1. Therefore, sensitivity becomes very high.

As the focus point adjusting means adjusts the distance, one having a small movable distance is good enough. Moreover, since the semiconductor laser is light in weight, one having a weak driving force is good enough. Therefore, a light source moving actuator for driving the semiconductor 21 using a voice coil motor, etc. is suitable.

Since a actuator using a voice coil motor is highly reliable, a tiny irregularity or vibration of the scanning surface, or focusing error caused by curvature of field of the fθ lnes within one scanning can be detected in real time so as to be auto-focused.

Particularly, in the case where the fθ lens has a curvature of field, the amount of the curvature of field is detected and memorized in advance, and the actuator is driven with a corrected bias amount so that a more effective result can be obtained.

Although a polygon mirror was used as a deflector in the above-mentioned two embodiments, vibrating mirror, such as a galvano mirror, etc. or a hologram scanner can be used. As the scanning lens, there can be used an fθ lens, an arc sine lens, etc. In any case, however, it is required to be telecentric in order to guide a reflected light to a light receiving means.

Furthermore, as a method for adjusting a focus point, the distance between the scanning surface and the scanning lens may be changed, otherwise the scanning lens itself may be displayed. However, although the former is optically most preferable as a method for adjusting a focus point, it requires a large driving apparatus. On the other hand, although the latter is a simpler driving system the performance of a lens, particularly the telecentric characteristic is delicately changed.

Also, in the above-mentioned example, since the beam for writing and the beam for detecting a focus point are the same, the beam for detecting a focus point is light subjected to ON/OFF modulation. Therefore, in the case where the OFF time is long and then it becomes ON, the focus point is detected in real time. However, the response for auto is slightly delayed. Therefore, it is effective when it is kept ON for a predetermined period of time outside the image drawing range and auto-focused so as to generally always follow the state of the scanning surface.

Furthermore, when the beam for writing is different from that for detecting the focus point and the latter leads the former, auto-focus can always be effected in real time.

In this case, the leading beam for detecting the focus point has a wavelength of a nonphotosensitive area of a photosensitive material, etc. on the scanning surface and shifting of the focus point due to chromatic aberrations is offset and corrected beforehand.

As described in the foregoing, according to this system, by receiving a beam reflected on the scanning surface, firstly, eccentricity, etc. of an optical element such as a lens, etc. can be detected by looking at an output power of the light receiving means. Therefore, in an optical scanning system unable to adopt a projecting method or the like, adjustment can be more easily performed than the prior art.

Secondly, the position of a beam waist can be brought into alignment with the scanning surface by detecting the focusing state of spot at real time. Even in the case where a small lens of F-number is used in order to reduce the diameter of the spot, there will not invite deterioration of image drawing performance due to focusing error.

MODIFIED EMBODIMENT OF THE fθ LENS

Next, there will be described a modified embodiment of a telecentric fθ lens used in the above-mentioned scanning optical system.

The above-mentioned two fθ lenses comprise, in order from an object field side, a first group including a negative meniscus lens with a concave surface thereof faced toward the object field, a second group including three positive lenses, the lens nearest to the object field side being a positive meniscus lens with a concave surface thereof faced toward the object field side, and a third group including a meniscus lens of a weak power with a concave surface thereof faced toward an image field.

However in order to increase the lens performance and to draw an image with high accuracy, it is more effective that they comprise, in order from an object field side, a first group including a negative meniscus lens with a concave surface thereof faced toward the object field, a second group including four or five positive lenses, the lens nearest to the object field side being a positive meniscus lens with a concave surface thereof faced toward the object field side, and a third group including a meniscus lens of a weak power with a concave surface thereof faced toward an image field.

Now, there will be described a telecentric fθ lens which satisfies the above-mentioned conditions.

This lens is a telecentric system in which an entrance pupil is located in a front focus point position. Therefore, light outside the axis is separated from the optical axis by the first group to generate a positive distortion aberration. Since the beam outside the axis including the principal ray of light passes through an area away from the optical axis of the second group lens system, the positive distortion aberration, which was generated by the first group, is cancelled and at the same time, a negative distortion aberration of fθ proportionate to the incident angle to the image height is generated by the positive lens group of the second group.

However, when the ray of light outside the axis passes through the peripheral part of the positive lens group of the second group, an inwardly-directed coma aberration is generated.

Therefore, in the present invention, a negative meniscus lens with its concave surface faced toward the object field side is used in the first group in order to generate an outwardly-directed coma aberration to reduce the inner coma aberration.

Also, since the second group includes four or five positive lenses having a large radius of curvature on average, it can restrain the generation of a spherical aberration which is under corrected. Also, the spherical aberration which is not sufficiently corrected can be cancelled and corrected by the excessively corrected spherical aberration generated by the first group.

Also, the negative power of the first group acts in such a manner as to cancel the increase of the Petzval sum by means of the positive lens of the second group. However, since the Petzval sum is positive, the curvature of field still remains. Therefore, the remainder is corrected by the third lens group. Since the power of the third lens group is weak, it hardly affects the composed focus point, the spherical aberration, the coma, etc. However, since the third group includes a meniscus lens with its concave surface faced toward the image side and the height from the optical axis is greatly changed when the ray of light passes through the lens, it has such a function as to reduce the Petzval sum, thereby to effectively correct the curvature of field.

Furthermore, when the following condition is satisfied in addition to the above-mentioned conditions for arrange, a lens of higher performance can be provided.

That is, the focus length f of the whole system, the focus lengths f1, f2 and f3 of the first to third groups, the radius of curvature r1 of the first surface and the radius of curvature of the final surface $r_L$ satisfy the following conditions:

$$0.80 < |f1|/f < 2.50, \; f1 < 0 \quad \text{①}$$

$$0.50 < |f2|/f < 1.10 \quad \text{②}$$

$$-0.5 < f/f3 < 0.04 \quad \text{③}$$

$$0.25 < |r1|/f < 0.65, \; r1 < 0 \quad \text{④}$$

$$0.60 < r_L/f < 1.20 \quad \text{⑤}$$

The conditional expressions ① through ⑤ will be described. Firstly, in the condition of ①, when $r_L/f$ is lower than the lowest limit, the negative power of the first lens group becomes excessively large. As a result, the spherical aberration is excessively corrected and the generation of the outwardly-directed coma aberration becomes large. In addition, the generation of the positive distortion aberration becomes large. As a result, displacement from the fθ characteristic becomes large.

When it exceeds the expression ①, the negative power of the first lens group becomes weak, and the function for correcting the spherical aberration and the inwardly-directed coma aberration generated in the second group is lowered. At the same time, the Petzval sum of the whole system is increased to generate the curvature of field.

In the condition of ②, when it is lower than the lowest limit, the positive power of the second lens group becomes excessively large. As a result, insufficient correction of the spherical aberration and the increase of the inwardly-directed coma aberration are invited. As a result, the Petzval sum is increased to generate the curvature of field.

When it exceeds the uppermost limit, the positive power becomes weak, and no negative distortion aberration can be obtained due to the fθ characteristic.

In the condition of ③, when it is lower than the lowest limit, the negative power of the third lens group becomes excessive. As a result, the spherical aberration is excessively corrected.

In case that the third lens group includes a positive lens which is very low in power, the height of the ray of light can be differentiated at both surfaces of the lens by properly selecting the values of the thickness of the lens and the radius of curvature. As a result, the Petzval sum can be reduced. However, when it exceeds the uppermost limit, the Petzval sum becomes excessively large to generate the curvature of field.

Incidently, in the first lens group, there is employed a negative meniscus lens with its concave surface faced toward the object field side in order to restrain the astigmatism occurred here and to correct the curvature of field occurred in the second group. In other words, the incident pupil is present at the front focus point position, and light outside the axis is made incident to the incident surface of the first lens group at a relatively small angle and emitted from the outgoing surface of the first lens group at a relatively small angle. Therefore, the astigmatism generated here is small.

Moreover, at both surfaces of this lens, the height of the ray of light is differentiated and the Petzval sum is reduced to correct the curvature of field.

Also, the beam on the axis becomes a divergent beam refracted on the first plane and is made incident to the second plane in its generally concentric state. Therefore, only a few spherical aberrations are generated on the second plane. However, the generation of the excessively corrected spherical aberration on the first plane corrects the insufficiently corrected spherical aberration by the second group. Therefore, the expression ④ characterizing the first plane is indispensable.

In the case where it is lower than the lowest limit, the spherical aberration is excessively corrected and a higher order spherical aberration is generated.

On the contrary, in the case where it exceeds the uppermost limit, the insufficiently corrected spherical aberration generated by the second lens group cannot be canceled. Further, since the refractive power becomes weak on the first plane, the difference in height of the ray of light on both surfaces of the lens of the first group becomes small, and the negative Petzval sum of the first group approaches to 0, thus resulting in insufficient correction of the curvature of field.

In the case where it is lowered than the lowest limit of the condition of ⑤, the effective diameter becomes small.

Therefore, the scanning range becomes narrow unless the telecentric characteristic is broken down.

In the case where it exceeds the uppermost limit, the action for canceling the positive Petzval sum generated by the second group is weak and the curvature of field is generated.

Several embodiments of the telecentric fθ lens, which satisfy the above-mentioned conditional expressions will now be described.

Figure 17:
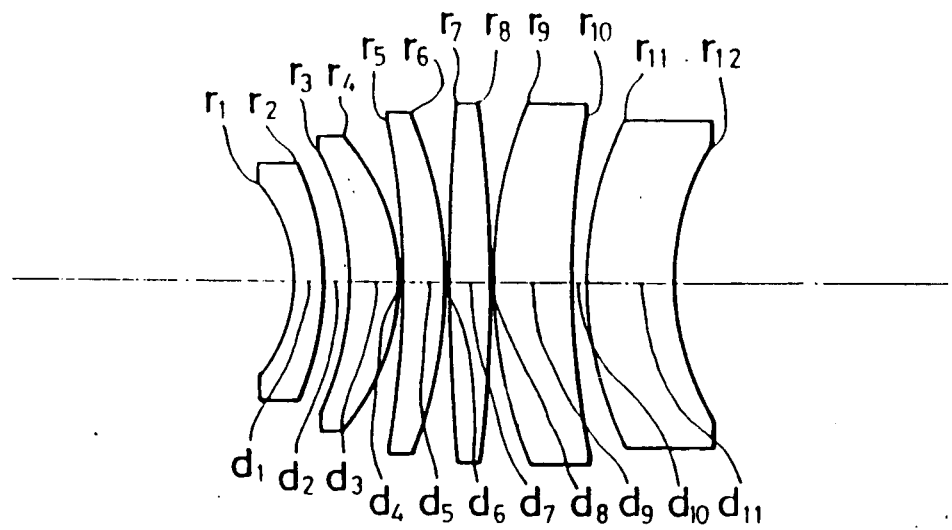
Figure 18A:
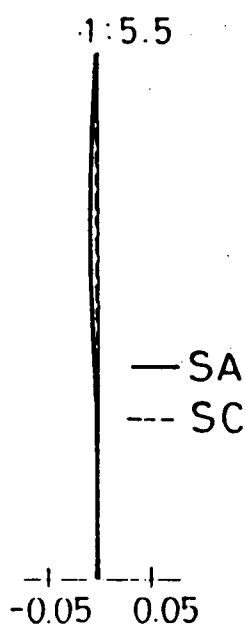
Figure 18B:
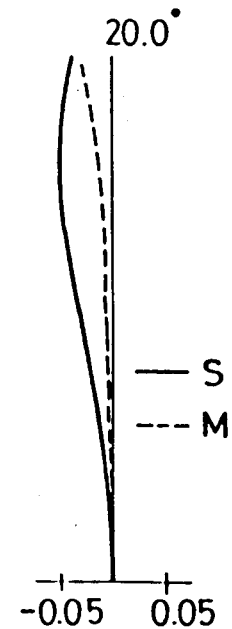
Figure 18C:
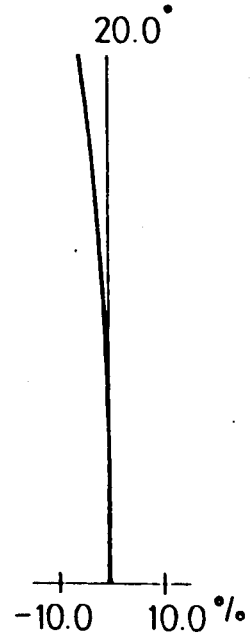
Figure 21:
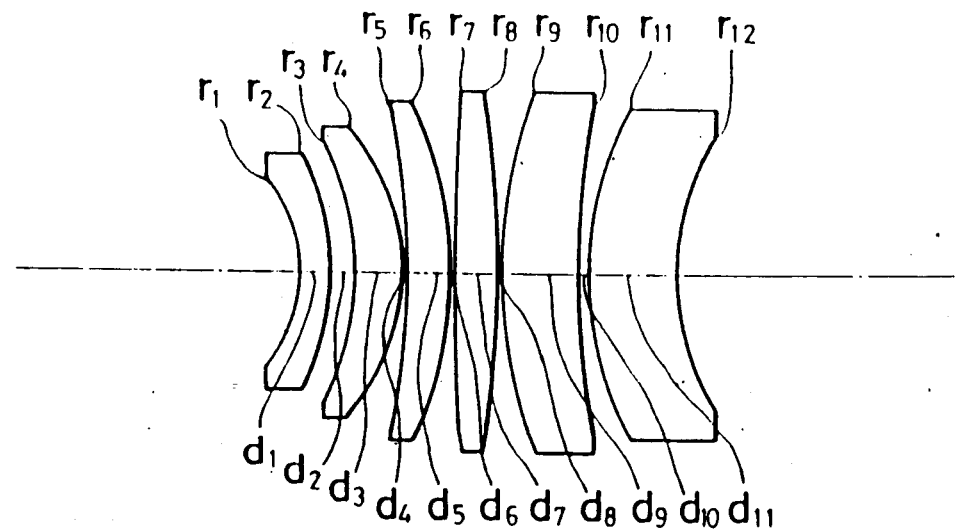
Figure 22A:
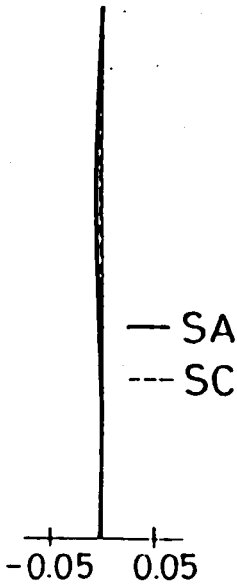
Figure 22B:
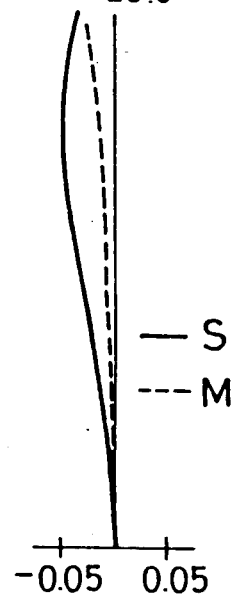
Figure 22C:
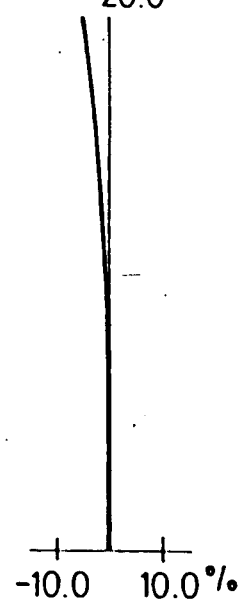
Figure 23:
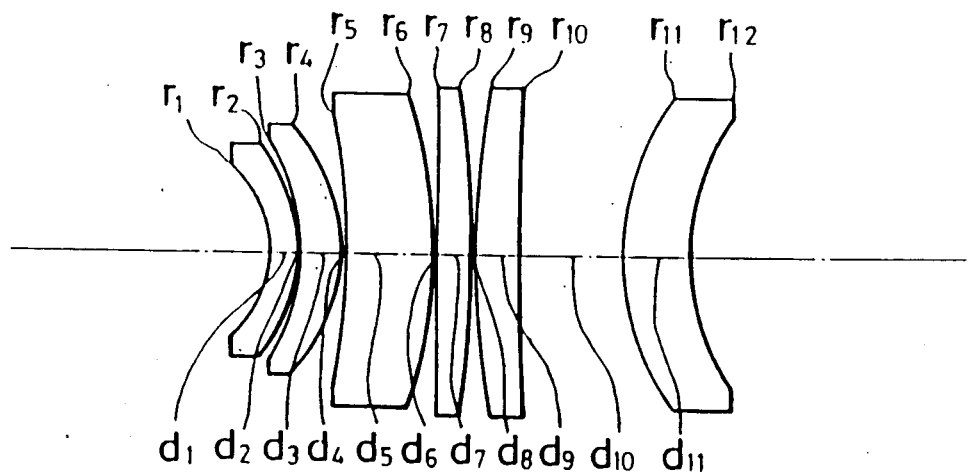
Figure 24A:
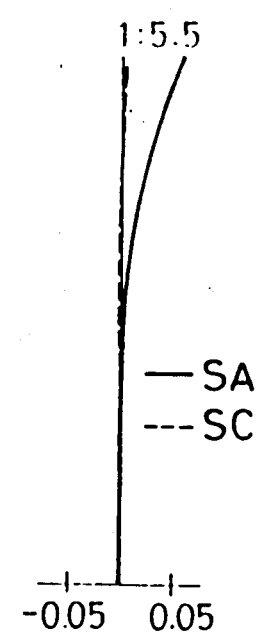
Figure 24B:
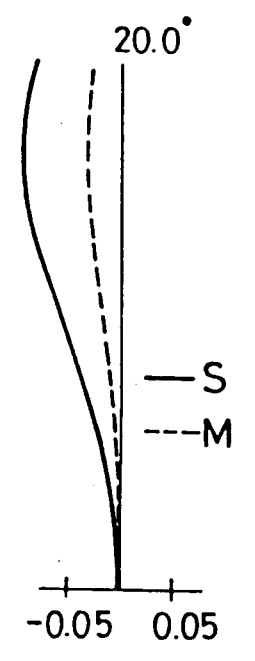
Figure 24C:
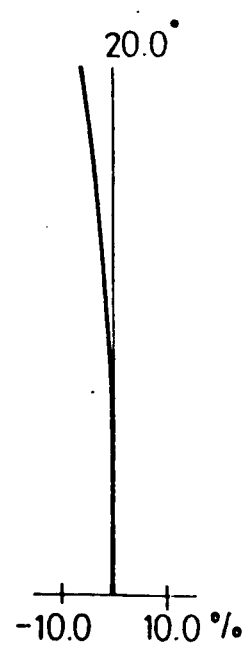
Figure 25:
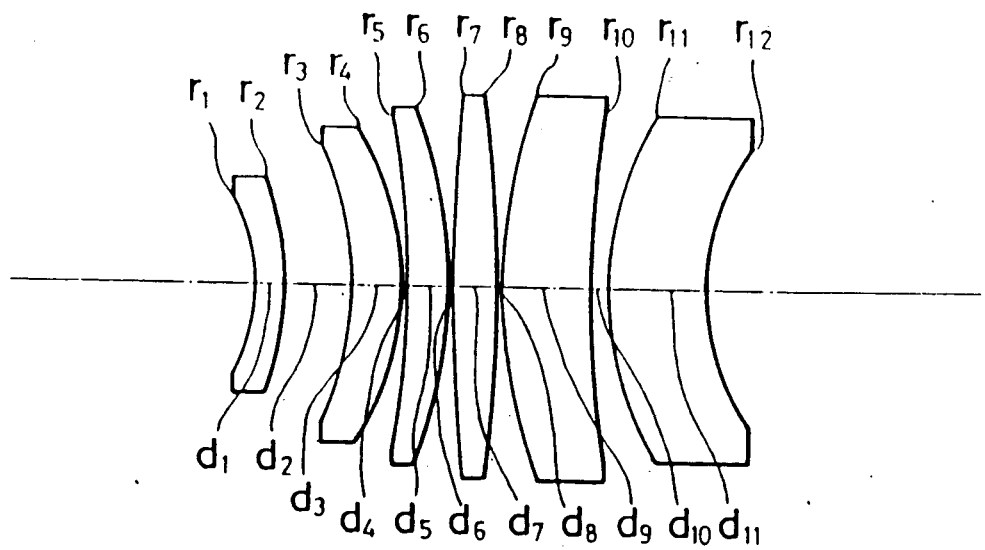
Figure 26A:
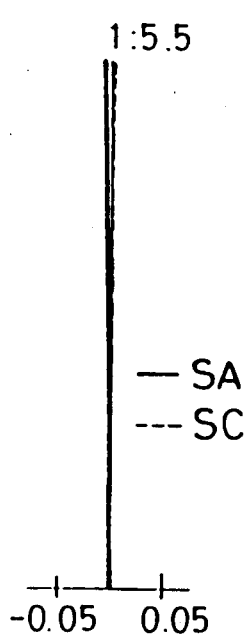
Figure 26B:
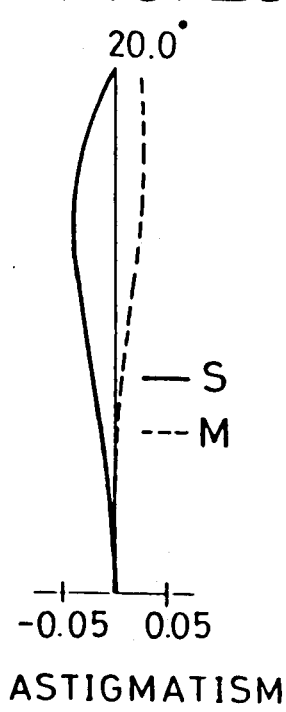
Figure 26C:
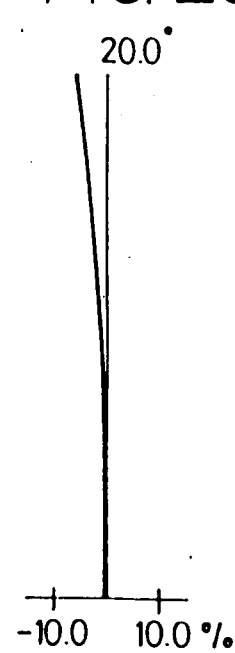
Figure 27:
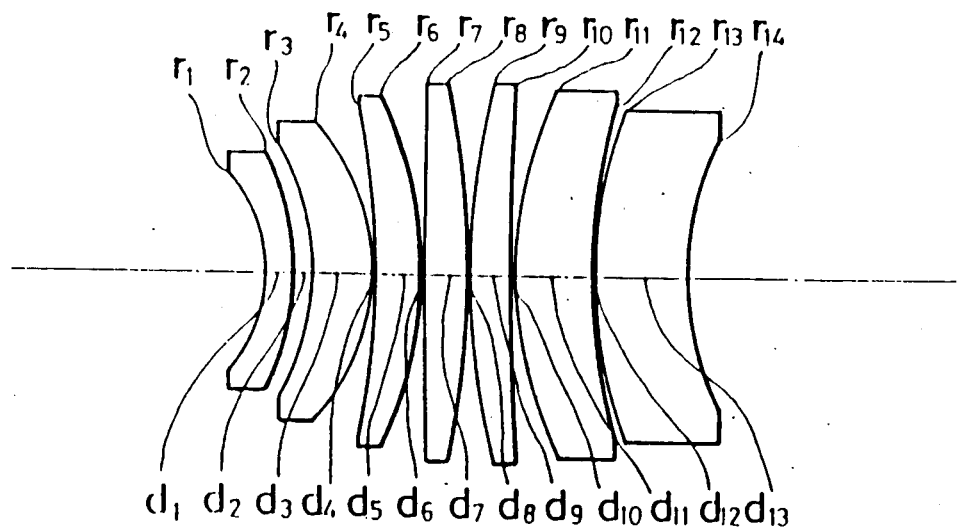
Figure 28A:
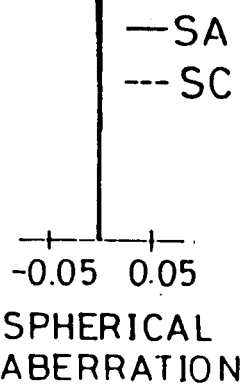
Figure 28B:
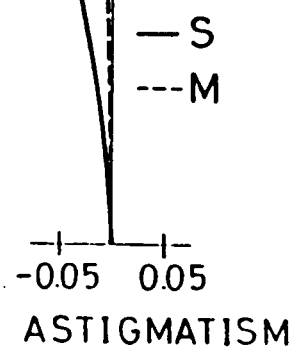
Figure 28C:
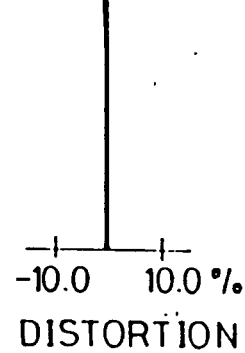
Figure 29:
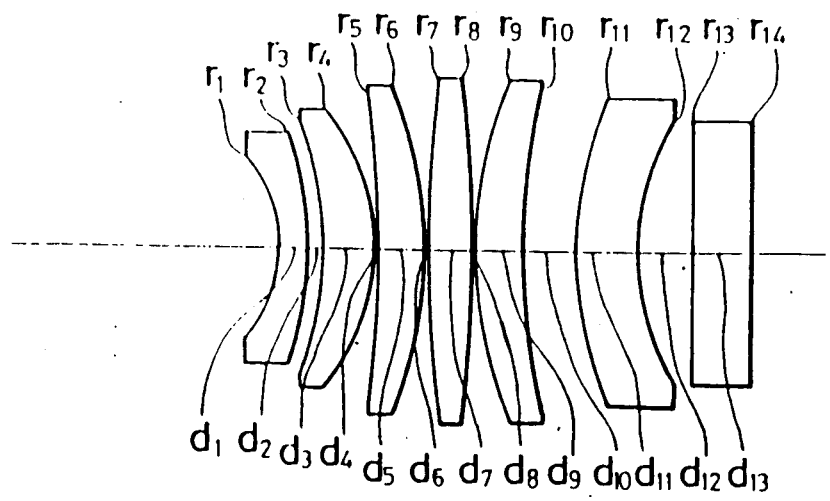
Figure 29:
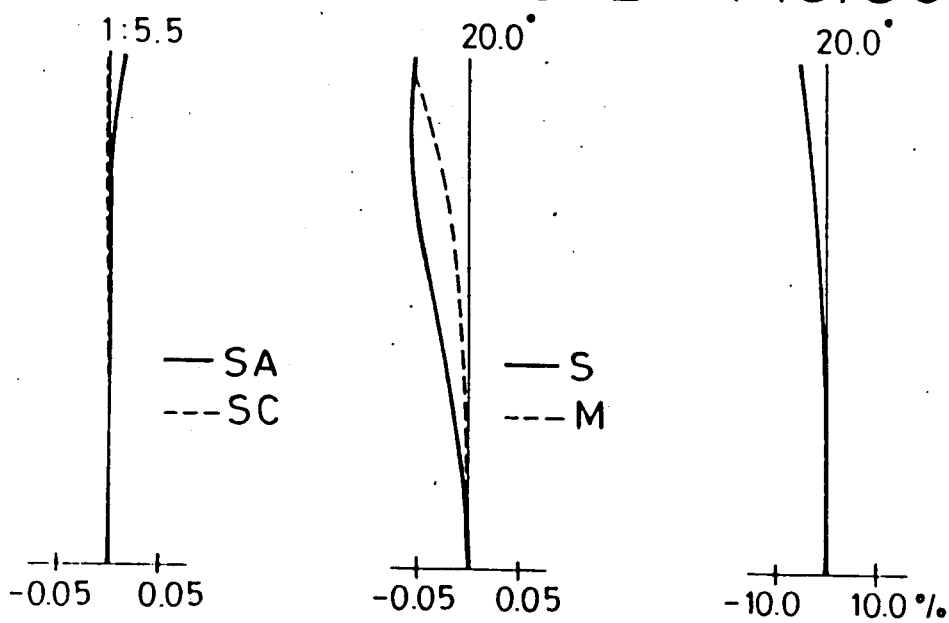

The construction and aberration characteristic of each embodiment are as shown in FIG. 17 through 18.

Concrete numeric values of these lenses are as shown in Table 3 through Table 9. In the Tables, reference characters FNO. represents the F-number of whole system, f represents the focus length of whole system, 2θ represents the maximum incident angle at both sides sandwiching the optical axis, d0 represents the distance between the pupil position and the first plane of the lens, r represents the radius of curvature of the plane of the lens system, d represents the lens thickness and the distance of air clearance, and n represents the refractive index of the lens. The units are mm.

In the figures showing the aberration, the spherical aberration SA is shown by a solid line and the sine condition SC is shown by a broken line. The astigmatism is shown by a solid line at its sagital direction S and a broken line at its meridional direction M. The values of the conditional expressions ①~⑤ in the various modified embodiments are as shown in Table 10. The first to fifth modified embodiments are of six pieces construction, the sixth modified embodiment is of seven pieces construction and the seventh modified embodiment is of six piece construction with a polarized beam splitter disposed at the object field side.

TABLE 3

[fθ lens variable example 1]

| FNO. = 5.5 | f = 151.050 | 2θ = 40° | d0 = 97.636 |
|---|---|---|---|
| r1 = −64.955 | d1 = 13.535 | n1 = 1.80593 |
| r2 = −127.339 | d2 = 11.967 | |
| r3 = −133.744 | d3 = 22.572 | n3 = 1.80593 |
| r4 = −98.352 | d4 = 1.500 | |
| r5 = −411.049 | d5 = 19.553 | n5 = 1.80593 |
| r6 = −193.390 | d6 = 1.500 | |
| r7 = 884.898 | d7 = 19.089 | n7 = 1.80593 |
| r8 = −647.956 | d8 = 1.500 | |
| r9 = 220.514 | d9 = 35.000 | n9 = 1.80593 |
| r10 = 417.110 | d10 = 6.899 | |
| r11 = 170.175 | d11 = 40.000 | n11 = 1.80593 |
| r12 = 121.495 | | |

TABLE 4

[fθ lens variable example 2]

| FNO. = 5.5 | f = 151.048 | 2θ = 40° | d0 = 95.616 |
|---|---|---|---|
| r1 = −65.340 | d1 = 13.000 | n1 = 1.52177 |
| r2 = −121.192 | d2 = 13.827 | |
| r3 = −110.436 | d3 = 25.544 | n3 = 1.80593 |
| r4 = −104.556 | d4 = 1.500 | |
| r5 = −377.192 | d5 = 19.879 | n5 = 1.80593 |
| r6 = −182.574 | d6 = 1.500 | |
| r7 = 877.192 | d7 = 19.754 | n7 = 1.80593 |
| r8 = −571.536 | d8 = 1.500 | |
| r9 = 209.881 | d9 = 35.000 | n9 = 1.80593 |
| r10 = 343.339 | d10 = 1.500 | |
| r11 = 166.824 | d11 = 40.000 | n11 = 1.80593 |
| r12 = 120.312 | | |

TABLE 5

[fθ lens variable example 3]

| FNO. = 5.5 | f = 151.049 | 2θ = 40° | d0 = 96.780 |
|---|---|---|---|
| r1 = −65.222 | d1 = 13.000 | n1 = 1.89785 |
| r2 = −120.493 | d2 = 11.454 | |
| r3 = −126.761 | d3 = 22.148 | n3 = 1.80593 |
| r4 = −97.368 | d4 = 1.500 | |
| r5 = −353.605 | d5 = 19.819 | n5 = 1.80593 |
| r6 = −178.572 | d6 = 1.500 | |
| r7 = 1053.258 | d7 = 19.613 | n7 = 1.80593 |
| r8 = −533.913 | d8 = 1.500 | |
| r9 = 223.111 | d9 = 35.000 | n9 = 1.80593 |
| r10 = 410.650 | d10 = 4.834 | |
| r11 = 161.395 | d11 = 40.000 | n11 = 1.80593 |
| r12 = 118.695 | | |

TABLE 6

[fθ lens variable example 4]

| FNO. = 5.5 | f = 152.026 | 2θ = 40° | d0 = 87.589 |
|---|---|---|---|
| r1 = −51.000 | d1 = 13.000 | n1 = 1.80593 |
| r2 = −71.978 | d2 = 1.000 | |
| r3 = −90.308 | d3 = 19.098 | n3 = 1.80593 |
| r4 = −77.208 | d4 = 1.500 | |
| r5 = −319.851 | d5 = 40.000 | n5 = 1.80593 |
| r6 = −224.307 | d6 = 1.500 | |
| r7 = 8828.940 | d7 = 15.645 | n7 = 1.80593 |
| r8 = −522.128 | d8 = 1.500 | |
| r9 = 377.329 | d9 = 20.520 | n9 = 1.80593 |
| r10 = 1334.778 | d10 = 46.667 | |
| r11 = 116.659 | d11 = 30.432 | n11 = 1.80593 |

TABLE 6-continued

[fθ lens variable example 4]

| FNO. = 5.5 | f = 152.026 | 2θ = 40° | d0 = 87.589 |
|---|---|---|---|
| r12 = 106.346 | | | |

TABLE 7

[fθ lens variable example 5]

| FNO. = 5.5 | f = 151.795 | 2θ = 40° | d0 = 85.000 |
|---|---|---|---|
| r1 = −81.000 | d1 = 13.011 | n1 = 1.80593 |
| r2 = −149.616 | d2 = 30.697 | |
| r3 = −147.170 | d3 = 23.340 | n3 = 1.80593 |
| r4 = −127.894 | d4 = 1.500 | |
| r5 = −453.770 | d5 = 19.614 | n5 = 1.80593 |
| r6 = −208.138 | d6 = 1.500 | |
| r7 = 891.178 | d7 = 20.111 | n7 = 1.80593 |
| r8 = −622.041 | d8 = 1.500 | |
| r9 = 223.013 | d9 = 40.000 | n9 = 1.80593 |
| r10 = 475.636 | d10 = 7.823 | |
| r11 = 145.978 | d11 = 45.000 | n11 = 1.80593 |
| r12 = 107.260 | | |

TABLE 8

[fθ lens variable example 6]

| FNO. = 5.5 | f = 151.050 | 2θ = 40° | d0 = 98.841 |
|---|---|---|---|
| r1 = −65.152 | d1 = 13.000 | n1 = 1.70425 |
| r2 = −111.735 | d2 = 9.165 | |
| r3 = −105.164 | d3 = 26.743 | n3 = 1.70425 |
| r4 = −96.591 | d4 = 1.500 | |
| r5 = −356.941 | d5 = 20.496 | n5 = 1.70425 |
| r6 = −175.795 | d6 = 1.500 | |
| r7 = 3096.440 | d7 = 19.698 | n7 = 1.70425 |
| r8 = −416.198 | d8 = 1.500 | |
| r9 = 330.069 | d9 = 19.072 | n9 = 1.70425 |
| r10 = 1718.947 | d10 = 1.500 | |
| r11 = 185.035 | d11 = 35.000 | n11 = 1.70425 |
| r12 = 251.877 | d12 = 1.500 | |
| r13 = 208.839 | d13 = 40.000 | n13 = 1.70425 |
| r14 = 120.211 | | |

TABLE 9

[fθ lens variable example 7]

| FNO. = 5.5 | f = 151.207 | 2θ = 40° | d0 = 94.030 |
|---|---|---|---|
| r1 = −63.450 | d1 = 14.000 | n1 = 1.80593 |
| r2 = −155.860 | d2 = 6.830 | |
| r3 = −155.000 | d3 = 24.750 | n3 = 1.80593 |
| r4 = −96.016 | d4 = 1.540 | |
| r5 = −487.370 | d5 = 21.700 | n5 = 1.80593 |
| r6 = −192.980 | d6 = 1.500 | |
| r7 = 684.351 | d7 = 20.200 | n7 = 1.80593 |
| r8 = −684.351 | d8 = 1.500 | |
| r9 = 200.000 | d9 = 22.000 | n9 = 1.80593 |
| r10 = 312.400 | d10 = 24.400 | |
| r11 = 173.534 | d11 = 30.000 | n11 = 1.80593 |
| r12 = 126.660 | d12 = 24.000 | |
| r13 = ∞ | d13 = 28.000 | n13 = 1.79807 |
| r14 = ∞ | | |

TABLE 10

| | \|f1\|/f | \|f2\|/f | f/f3 | r1\|/f·r$_L$/f |
|---|---|---|---|---|
| Variable example 1 | 1.21 | 0.70 | −0.18 | 0.43 | 0.80 |
| Variable example 2 | 1.96 | 0.80 | −0.17 | 0.43 | 0.80 |
| Variable example 3 | 1.18 | 0.71 | −0.16 | 0.43 | 0.79 |
| Variable example 4 | 1.97 | 0.93 | 0.03 | 0.34 | 0.70 |
| Variable example 5 | 1.58 | 0.83 | −0.15 | 0.53 | 0.71 |
| Variable example 6 | 1.66 | 0.72 | −0.31 | 0.43 | 0.80 |
| Variable example 7 | 0.94 | 0.63 | −0.19 | 0.42 | 0.84 |

As described in the foregoing, by satisfying the predetermined arrangement conditions, there can be obtained a telecentric fθ lens having a small F-number and a large incident angle. Therefore, since a broad scanning area can be covered by reducing the spot system on the scanning surface and speedy drawing can be obtained with high accuracy.

Furthermore, by satisfying the conditional expressions ①~⑤, various aberrations, such as curvature of field, spherical aberration, etc. can be favorably corrected. In addition, there can be obtained a telecentric fθ lens having a spot diameter of 5 μm with high accuracy by means of an argon laser under the condition of F-number=5.5 and scanning width: 100 mm.

What is claimed is:

1. An optical scanning system, comprising:
   a light source portion for emitting a beam of light;
   a deflector for deflecting said beam of light emitted from said light source portion;
   a telecentric scanning lens for focusing said deflected beam of light onto a scanning surface;
   a beam splitter for splitting a beam of light reflected by said scanning surface, said beam splitter being disposed along an optical path between said deflector and said light source portion; and
   focus point detecting means for receiving a beam of light reflected by said scanning surface and split by said beam splitter, said detecting means detecting a focusing state of said deflected beam of light on said scanning surface.

2. An optical scanning system according to claim 1, wherein said light source portion comprises a semiconductor laser that generates a divergent laser beam, and a collimator lens for collimating said divergent laser beam.

3. An optical scanning system according to claim 1, wherein said telecentric scanning lens comprises a telecentric fθ lens.

4. An optical scanning system according to claim 1, wherein said beam splitter comprises a polarized beam splitter.

5. An optical scanning system according to claim 1, wherein said focus point detecting means comprises an anamorphotic system for focusing said beam of light split by said beam splitter, such that a vertical power differs from a horizontal power, and a light receiving element that is disposed at a spot position of said focused beam of light and which is adapted to detect a deformation of a configuration of said beam of light.

6. An optical scanning system according to claim 1, wherein said light source portion comprises a gas laser for generating a parallel laser beam, a modulator for modulating said parallel laser beam, and a beam expander for dilating said parallel laser beam.

7. An optical scanning system according to claim 6, wherein said gas laser comprises an argon laser.

8. An optical scanning system according to claim 1, further comprising focus point adjusting means for changing a focused position of said beam of light focused by said scanning lens in accordance with an output power of said focus point detecting means.

9. An optical scanning system according to claim 8, wherein said light source portion comprises a gas laser for generating a parallel laser beam, a modulator for modulating said parallel laser beam, and a beam expander for dilating said parallel laser beam, said focus point adjusting means causing a part of said beam expander to be moved along an optical axis of said beam expander.

10. An optical scanning system according to claim 8, wherein said light receiving portion comprises a semiconductor laser for generating a divergent laser beam, and a collimator lens for collimating said divergent laser beam, said focus point adjusting means causing said semiconductor laser to be moved along an optical axis of said semiconductor laser.

11. An optical scanning system according to claim 1, wherein said telecentric fθ lens comprises, in order from an object field side to an image field, a first lens group having a negative meniscus lens with a concave surface thereof that faces towards an object field; a second lens group having four positive lenses, the positive lens nearest to said object field side being a positive meniscus lens with a concave surface thereof that faces towards said object field side; and, a third lens group having a meniscus lens of a weak power with a concave surface thereof that faces towards said image field.

12. An optical scanning system according to claim 11, wherein said telecentric fθ lens satisfies the equations:

$$0.80 < |f1|/f2.50, f1 < 0;$$

$$0.50 < |f2|/f < 1.10;$$

$$-0.5 < f/f3 < 0.04;$$

$$0.25 < |r1|/f < 0.65, r1 < 0; \text{ and}$$

$$0.60 < rL/f < 1.20,$$

wherein f is a focus length of said optical scanning system, f1, f2 and f3 are focus lengths of said first lens group, second lens group and third lens group, respectively, r1 is a radius of curvature of a first plane, and rL is a radius of curvature of a final plane.

13. A telecentric fθ lens comprising, in order from an object field side to an image field, a first lens group having a negative meniscus lens with a concave surface thereof that faces towards an object field; a second lens group having four positive lenses, the positive lens nearest to said object field side being a positive meniscus lens with a concave surface thereof that faces towards said object field side; and, a third lens group having a meniscus lens of a weak power with a concave surface thereof that faces towards said image field.

14. The telecentric fθ lens according to claim 13, wherein said telecentric fθ lens satisifies the equations:

$$0.80 < |f1|/f2.50, f1 < 0;$$

$$0.50 < |f2|/f < 1.10;$$

$$-0.5 < f/f3 < 0.04;$$

$$0.25 < |r1|/f < 0.65, r1 < 0; \text{ and}$$

$$0.60 < rL/f < 1.20,$$

wherein f is a focus length of said optical scanning system, f1, f2 and f3 are focus lengths of said first lens group, second lens group and third lens group, respectively, r1 is a radius of curvature of a first plane, and rL is a radius of curvature of a final plane.

15. A method for adjusting an optical scanning system, comprising the steps of:
emitting a beam of light from a light source portion;
deflecting the beam of light emitted from said light source portion with a deflector;
focusing the deflected beam of light onto a scanning surface with a telecentric scanning lens;
splitting a beam of light reflected by the scanning surface and returned to a light source side of the light source portion through the scanning lens and the deflector with a beam splitter;
receiving the beam of light split by the beam splitter so as to detect a focused state of the beam of light deflected onto the scanning surface; and
adjusting optical elements of the optical scanning system based upon the detected focused state of the beam of light deflected onto the scanning surface.

* * * * *